United States Patent [19]

Chausse

[11] 4,216,947

[45] Aug. 12, 1980

[54] RADIATOR HOIST AND POSITIONER

[75] Inventor: Leon C. Chausse, Bellevue, Nebr.

[73] Assignee: Inland Manufacturing Company, Omaha, Nebr.

[21] Appl. No.: 922,868

[22] Filed: Jul. 7, 1978

[51] Int. Cl.³ .......... B23Q 1/04

[52] U.S. Cl. .......... 269/71; 269/208; 269/239

[58] Field of Search .......... 269/17, 71, 239, 208; 254/4 R, 124, 139.1

[56] References Cited

U.S. PATENT DOCUMENTS

| | | | |
|---|---|---|---|
| D. 198,588 | 7/1964 | Grasso | D54/14 |
| 919,971 | 4/1909 | Smith | 269/239 |
| 1,344,559 | 6/1920 | Ohmacht | 269/71 |
| 1,432,725 | 10/1922 | Nolting | 269/71 |
| 1,947,607 | 2/1934 | Marogg | 269/239 |
| 2,530,333 | 11/1950 | Jost | 269/71 |
| 2,591,210 | 4/1952 | Sowell | 269/239 |
| 2,669,958 | 2/1954 | Sweeney | 269/71 |
| 2,858,946 | 11/1958 | Breed | 254/139.1 |
| 3,027,158 | 3/1962 | Barbee | 269/71 |

*Primary Examiner*—Robert C. Watson

*Attorney, Agent, or Firm*—Allegretti, Newitt, Witcoff & McAndrews

[57] ABSTRACT

A radiator hoist and positioner includes an upright post supporting a rotatable swing arm. An extensible hoist line is mounted on the swing arm. A swivel connects a yoke structure to the hoist line. Rotatably mounted on the yoke structure are two clamp mechanisms; the clamp mechanisms are aligned for rotation. A pair of opposed pad members included in each clamp mechanism are advanced and retracted by an activator mechanism to clamp and unclamp a radiator. A clamped radiator is positioned as desired by rotating the clamp mechanisms, the yoke structure and the swing arm, and by extending or retracting the hoist line.

8 Claims, 5 Drawing Figures

Fig. 2
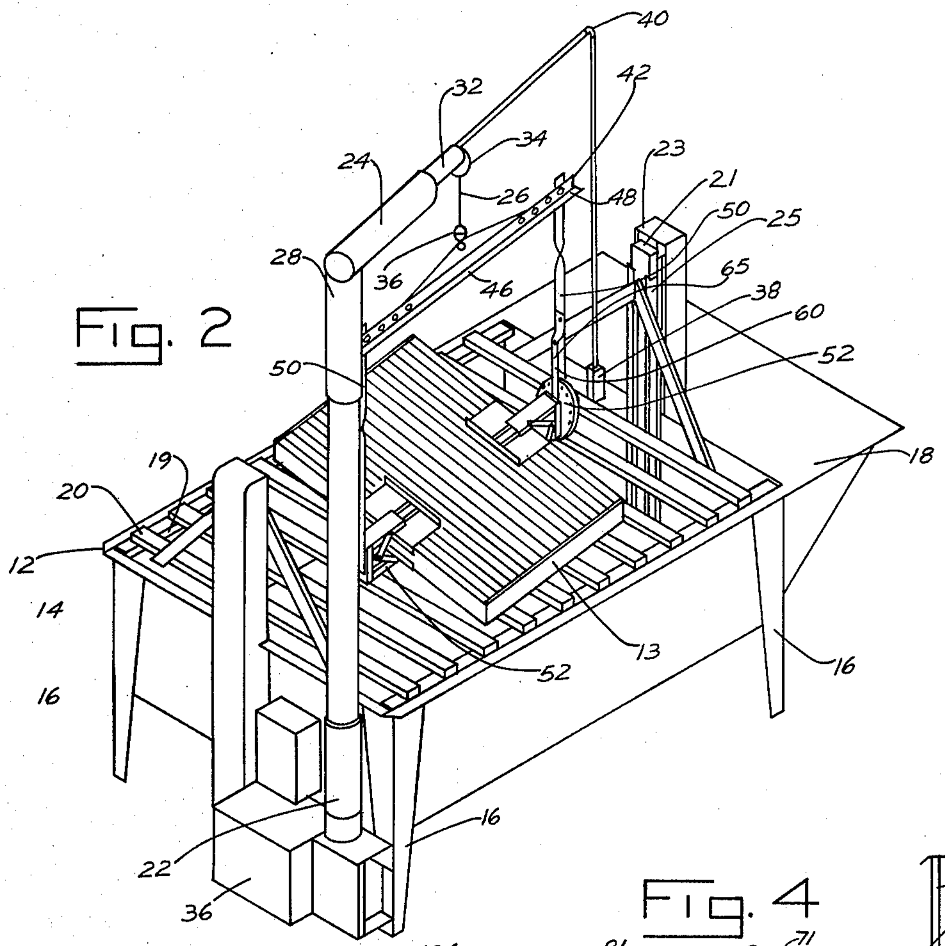
Fig. 4
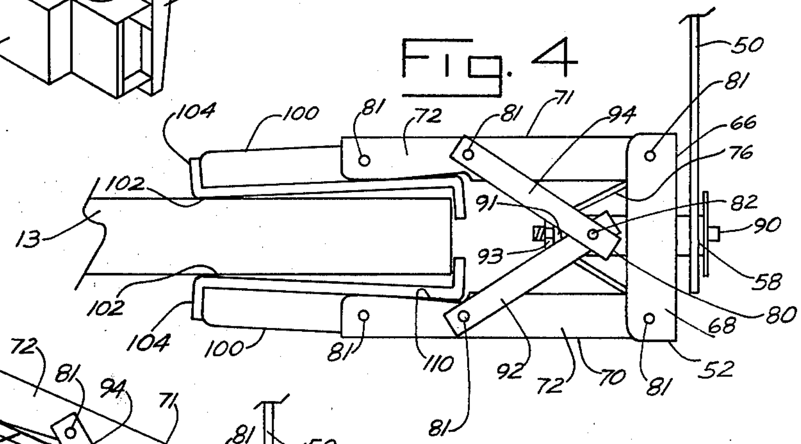
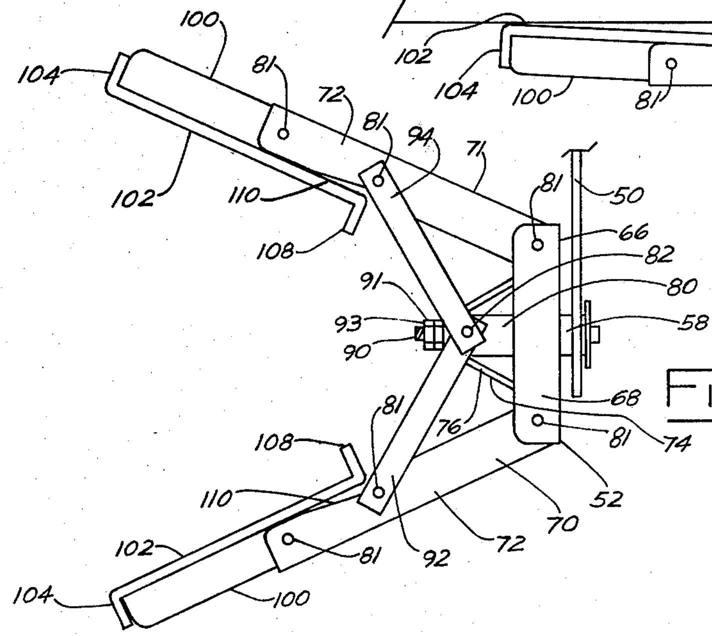
Fig. 3

RADIATOR HOIST AND POSITIONER

BACKGROUND OF THE INVENTION

The present invention relates to a hoist mechanism, and more particularly, to a radiator hoist and positioner.

Radiators, such as those utilized in the cooling systems of internal combustion engines, typically include a shell or housing that defines an internal fluid chamber and is surrounded by relatively fragile, outwardly projecting fins that transmit, or radiate, heat from the chamber to the environment. Because of the bulk and mass of some radiators built for industrial diesel engines and the like, transporting some radiators is a difficult task, of which a single man or small crew is incapable. However, because of the potential damage to delicate radiator fins, general purpose hoist mechanisms are generally not suitable for transporting radiators. As a result, specialized radiator hoists have been disclosed, including that disclosed in U.S. Pat. No. 3,027,158, issued Mar. 27, 1972 to T. L. Barbee and entitled Device for Manipulatively Supporting Automobile Radiators and Like Articles. While such hoists have been somewhat useful, they have generally not provided for positioning of a radiator in a sufficient variety of positions.

SUMMARY OF THE INVENTION

In a principal aspect, the present invention is an improved radiator hoist and positioner including an upright post which supports a swing arm for rotation about a first substantially vertical axis. Mounted on the swing arm is an extensible and retractable hoist line, and attached to the hoist line for rotation about a second substantially vertical axis is a yoke structure. At least two clamp mechanisms are rotatably mounted on the yoke structure; the clamp mechanisms are aligned for rotation about a common, substantially horizontal axis.

Each clamp mechanism includes a pair of opposed pad members which have generally planar radiator contact surfaces defined thereon. Each clamp mechanism further includes an actuator mechanism which performs two functions. First, the actuator mechanism advances and retracts the pad members toward and away from each other, so as to clamp and unclamp a radiator between the radiator contacting surfaces. Second, the actuator mechanism applies a force to the pad members so as to retain the pad members in the position in which the radiator is clamped. The radiator can thus be clamped by the clamp mechanisms, and raised or lowered by retracting or extending the hoist line. The radiator can also be rotated about the axes of rotation of the swing arm, the yoke structure and the clamp mechanisms.

It is thus an object of the present invention to provide an improved radiator hoist and positioner.

Another object of the present invention is to provide a radiator hoist and positioner which lifts or hoists a radiator, and which facilitates the manual rotation of a radiator about a first, remote vertical axis, a second, centralized vertical axis and a centralized horizontal axis.

Another object of the present invention is to provide an improved radiator hoist and positioner which includes a position locking mechanism for locking a radiator in a plurality of positions.

Another object of the present invention is to provide an improved radiator hoist and positioner which does not damage radiator fins because of excessive pressure.

Another object of the present invention is to provide an improved radiator hoist and positioner capable of handling or transporting relatively bulky and massive radiators.

A further object of the present invention is to provide an improved radiator hoist and positioner which may be readily adjusted to hoist and position radiators having cores of various thicknesses.

A still further object of the present invention is to provide an improved radiator hoist and positioner which facilitates the handling of a radiator at a radiator test and repair bench.

These and other objects of the present invention will become apparent from the description of the preferred embodiment of the present invention, which follows.

BRIEF DESCRIPTION OF THE DRAWING

The preferred embodiment of the present invention will be described in relation to the accompanying drawing, wherein:

FIG. 2 is a view similar to FIG. 1, depicting a radiator that has been hoisted and positioned atop the radiator test and repair bench;

FIG. 3 is an elevational view of a clamp mechanism of the radiator hoist and positioner of FIG. 1, depicting the pads thereof in a retracted position;

FIG. 4 is a view similar to FIG. 3, depicting the pads in an advanced, or clamping position, as shown in FIGS. 1 and 2.

DETAILED DESCRIPTION OF THE PREFERRED EMBODIMENT

Figure 1:
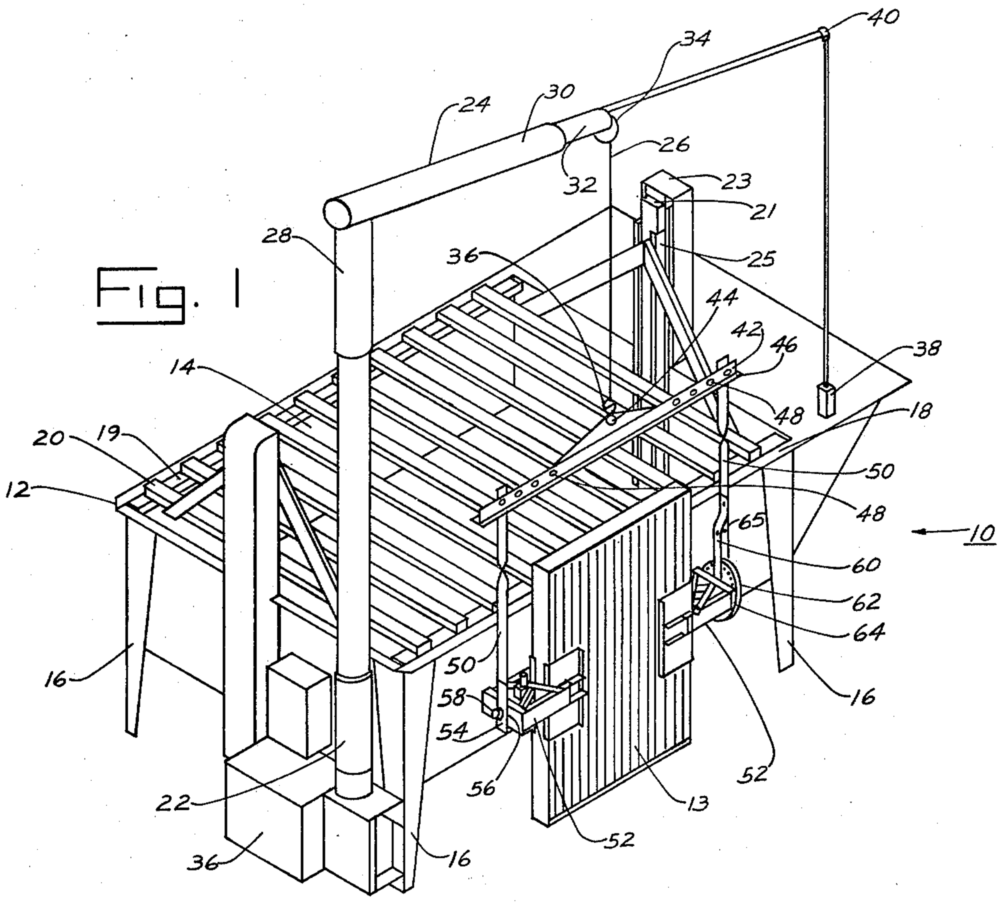
FIG. 1 is a generally frontal, perspective view of the radiator hoist and positioner of the preferred embodiment of the present invention, as utilized in combination with a radiator test and repair bench.

Referring to FIG. 1, the preferred embodiment of the present invention is a radiator hoist and positioner shown and generally designated 10. Positioned adjacent a radiator test and repair bench 12, the radiator hoist and positioner 10 is highly useful in the inspection and repair of radiators, in a radiator repair shop having a crew of only a few repairmen, or even one repairman alone.

As shown, the radiator test and repair bench 12 includes a bath 14 into which a radiator 13 may be placed for leakage testing or the like. The bath 14 is supported at its corners by four upright legs 16. A substantially planar rim 18 surrounds the bath 14. A grid 19 including spaced, horizontal slats 20 defines a working surface within the bath 14 upon which a radiator 13 may be supported.

The grid 19 is lowered so as to submerge the radiator 13 in the bath 14, and raised so as to cause the radiator 13 to emerge from the bath 14, by an elevator mechanism including slidably movable guides 21 and fixed posts 23.

The posts 23 extend above the rim 18 at the ends of the bath 14 and define vertical channels 25 for the vertical guides 21. The grid 19 is welded to the guides 21. An elevator drive mechanism (not shown), located under the bath 14, drives the guides 21 along the channels 25, to a desired height.

An upright, vertically elongated, cylindrical post 22 is mounted alongside and adjacent a corner of the radiator test and repair bench 12. A swing arm 24 is mounted for rotation about a substantially vertical axis atop the post 22, and mounted on the swing arm 24 is an extensible and retractable hoist line 26. The swing arm 24 includes an upright section 28 atop the post 22, and a horizontally elongated, outwardly projecting cylindrical arm section 30. The free end 32 of the arm section 30 projects over the central portion of the radiator test and repair bench 12, and the hoist line 26 extends downward from the free end 32.

The hoist line 26 passes across a pulley 34 at the free end 32 of the arm 30, passes through the arm 30, and down through the post 22, and is wound about a reel (not shown) contained within the enclosure 36 at the base of the post 22. A drive means such as a conventional, reversible electric motor (not shown) is also contained within the enclosure 36. The motor is operably connected to the reel on which the hoist line 26 is wound.

A control mechanism, such as an electrical control box 38, hangs from the outer end of a rigid conduit 40 that projects out the free end 32 of the arm 30. The control box 38 includes an electrical switch that is wired to the motor contained within the enclosure 36. The switch operates the motor to rotate the reel in either rotational direction to extend and retract the hoist line 26.

Connected to the hoist line 26 is a yoke structure 42. The end of the hoist line 26 is attached to a swivel connector such as a swivel hook 36 which is hooked through an opening 44 defined at the center of a horizontally elongated, T-shaped cross member 46. The cross member 46, and thus the entire yoke structure 42, is rotatable about the vertical axis of rotation defined by the swivel hook 36.

The cross member 46 is formed of two L-shaped members fastened on opposite sides of a planar center member or spacer. A series of spaced fastener holes 48 are defined along either end portion of the cross member 46. Fastened or bolted to the cross member 46 through fastener holes 48 are vertically elongated, downwardly extending side members 50. The side members 50 may be fastened through any one of the fastener holes 48. The width separating the side members 50 may thereby be adjusted to accomodate radiators of various widths.

A clamp mechanism 52 is mounted at the lower end of each side member 50. As can be seen in FIGS. 1–2, each side member 50 has a backing, or strengthening plate 54 welded along the outside surface of its lower end. An aperture 56 is cut through the backing plate 54 and the lower end of the side member 50, and into this aperture 56 a bushing 58 is affixed. As shown in FIGS. 3 and 4, fastener 90 to which the clamp mechanism 52 is attached, passes through the bushing 58.

As shown in FIGS. 1–2, a member 60 is attached to the inner surface of a lower end of one of the side members 50. Member 60 extends downward substantially parallel to the side member 50 and past the apertures 56. Two substantially circular discs 62, 64 are mounted between the member 60 and the side member 50. The outer disc 62 is fastened to the side member 50 and the inner disc 64 is fastened to the clamp mechanism 52. Each disc 62, 64 has circumferentially spaced holes at like radial distances from the disc centers. Holes on either disc 62, 64 are aligned, if desired, and a fastener secured through the holes. The discs 62, 64 are thereby fixed or locked in rotational position with respect to each other.

A fastener 65, such as a bolt and wing nut, joins the upper ends of members 50, 60. The tension in the fastener 65 presses the discs 62, 64 together. By adjusting the tension in the fastener 64, the frictional forces between the discs 62, 64 can be increased to overcome any rotational imbalance of a radiator, or decreased to permit substantially free rotation.

Figure 5:
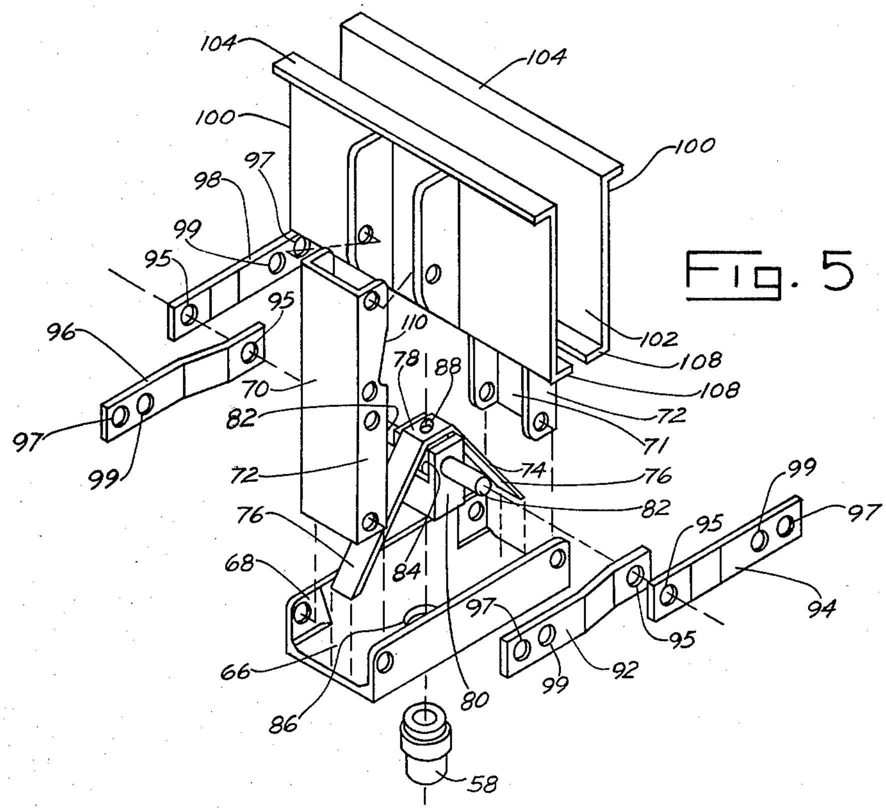
FIG. 5 is an exploded, perspective view of the clamp mechanism of FIGS. 1–4.

Referring to FIGS. 3–5, each clamp mechanism 52 includes a backing plate 66 that is U-shaped. The flanges 68 of the backing plate 66 extend away from the end of the adjacent side member 50. Clamp side members 70, 71, that are generally U-shaped in cross-section, are pinned at either end of the base plate 66. Flanges 72 of the side members 70, 71 extend inward, or toward the center of the backing plate 66. Welded to the backing plate 66 between the clamp side members 70, 71 is a guide member 74 having a blunted V-shape. The slanted side sections 76 of the guide member 74 meet at a planar central section 78 adjacent the center of the base plate 66.

A generally rectangular trunnion member 80 is positioned between the guide member 74 and the base plate 66. Two spaced, parallel flanges 81 of the trunnion member 80 project upward from the top surface of the trunnion member 80, defining a slot for the central section 78 of the guide member 72. Pins 82 project outward from the flanges 81, transverse to the lengths of the base plate 66 and the guide member 74. Defined within the top surface of the trunnion member 80, between the flanges 81, is a channel 84. Channel 84 is substantially perpendicular to the central portion of the backing plate 66, and is aligned with both an opening 86 formed in the center of the base plate 66, and an opening 88 formed within the central section 78 of the guide member 74. The channel 84 is threaded. Passing through the bushing 58 and the openings 86, 88 and engaging the threads along the channel 84 is the fastener 90. Lock nuts 91, 93 engage the end of the fastener 90 adjacent the guide member 74, to retain the fastener 90 in a fixed position relative to the backing plate 66.

Rotation of the fastener 90 causes movement of the trunnion 80 axially along the fastener 90. Links 92, 94 are rotatably mounted by pins 81 or the like along the flanges 72 of the clamp side member 70, 71, respectively, and rotatably mounted upon one of the pivot pins 82. Links 96, 98 are rotatably mounted by pins 81 along the other flanges 72 of the clamp side members 70, 71 respectively, and rotatably mounted upon the other pin 82. Links 92, 94 rotate the clamp side members 70, 71 about the axes in which the side members 70, 71 are pinned to the base plate 66. The clamp side members 70, 71 are thus advanced or retracted toward or away from each other.

As shown only in FIG. 5, the links 92, 94, 96, 98 have pin openings 95, 97 at their ends to accommodate the pins 81, 82, respectively. A second set of pin openings 99 are defined in the links 92, 94, 96, 98 adjacent the pin openings 97 to adjust the pin-to-pin lengths of the links 92, 94, 96, 98 and accommodate two ranges of radiator widths.

A clamp pad 100 is attached by pins 81 or the like to the outer end of each clamp side member 70, 71. The clamp pads 100 each include a generally planar, relatively large, radiator contacting surface 102. At an edge of the surface 102 away from the backing plate 66, a flange 104 projects outwardly from the surface 102. At the edge toward the base plate 66, a flange 108 projects inwardly from the surface 102. As shown, the radiator contacting surfaces 102 face each other. Because each flange 72 of the clamp side member 70, 71 defines notches 110, the surfaces 102 remain substantially parallel to one another in a variety of positions of the clamp side members 70, 71.

The clamp pads 100 are brought into contact with the sides of a radiator 13 by advancing the clamp side members 70, 71 toward each other. Pressure sufficient to retain the radiator between the clamp pads 100 without slippage is applied by further advancing the clamp side members 70, 71. Because of the size of the clamp pads 100, sufficient force to retain the radiator is reached without damage to the radiator fins. The pad members 100, when pressed against a radiator 13, cant slightly, with the edges of the surfaces 102 adjacent the flanges 104 slightly closer than the edges adjacent the flanges 108.

A radiator 13 is brought alongside the radiator repair bench 12 on a hand truck or by any other desired means. The side members 50 are then fastened along the cross member 46 at a distance such that the clamp pads 100, when advanced, contact the radiator sides. As most preferred, the flanges 108 abut the end of the radiator 13 or the radiator frame. The yoke structre 42, with the clamp mechanisms 52 attached, is then lowered so that the clamp pads 100 are adjacent the midpoint or center of gravity of the radiator. With the clamp mechanisms 52 thus positioned, the fasteners 90 are rotated to draw the trunnion 80 toward the base plate 66, advancing the clamp side members 70, 71 and the clamp pads 100. Once the radiator 13 is secured, the yoke structure 42 and the radiator are hoisted and swung to a position above the repair bench, where the radiator may be rotated about the substantially horizontal axis of the clamp mechanisms 52, and about the substantially vertical axis of the swivel hook 36. If desired, the radiator 13 may be locked into a particular rotational position by placing a pin through appropriate openings in the discs 62, 64.

From the foregoing, it should be apparent to those of ordinary skill in the art that a highly useful radiator hoist and positioner has been disclosed herein. It should also be apparent that the radiator hoist and positioner 10 of the preferred embodiment of the present invention could be modified in certain respects. For example, rotation of the swing arm 24 could be automated, as could rotation of the clamp mechanisms 52. The preferred embodiment of the present invention is thus to be considered as illustrative and not restrictive. The scope of the present invention is to be measured by the appended claims.

What is claimed is:

1. An improved radiator hoist and positioner comprising:

an upright post;

a swing arm supported on the upright post for rotation about a first, substantially vertical axis;

an extensible and retractable hoist line mounted on the swing arm;

a yoke structure mounted on the hoist line for rotation about a second, substantially vertical axis;

at least two clamp mechanisms each including a pair of opposed pad members having generally planar radiator contacting surfaces defined thereon and further having an actuator mechanism (1) for advancing and retracting the pad members toward and away from each other so as to clamp and unclamp a radiator between the radiator contacting surfaces, and (2) for applying a force to the pad members so as to retain the pad members in the position in which the radiator is clamped, the clamp mechanisms mounted on the yoke structure for rotation about a common, substantially horizontal axis the clamp mechanisms each further including a base plate, and the actuator mechanism including a trunnion member, links connecting the pad members and the trunnion member, and means for drawing the trunnion member toward and away from the base plate, whereby the links are moved, respectively, toward and away from the base plate and the pad members are moved, respectively, toward and away from each other;

whereby a radiator is clamped, and raised or lowered by retracting or extending the hoist line, or rotated about the axes of rotation of the swing arm, yoke structure and clamp mechanisms, to a variety of desired positions.

2. An improved radiator hoist and positioner as in claim 1 in which the means for drawing the trunnion member toward and away from the base plate includes a guide member mounted on the base plate and a threaded fastener mounted for free rotation on the guide member and the base plate, with the trunnion member defining a threaded channel and the threaded fastener engaging the threaded channel, whereby rotation of the threaded fastener causes axial movement of the trunnion member and mechanical advantage is gained in the movement of the pad members.

3. An improved radiator hoist and positioner as in claim 2 in which the pad members are mounted on the base plate for rotation about rotational axes perpendicular to the axis defined by axial movement of the trunnion member and wherein the axial movement of the trunnion member causes rotational movement about the rotational axes.

4. An improved radiator hoist and positioner as claimed in claim 1 further comprising means for locking said clamp mechanisms in at least one rotational position thereof.

5. An improved radiator hoist and postioner as claimed in claim 1 wherein the radiator contacting surface of each pad member has a surface area such that the force applied against the pad member to clamp a radiator results in a pressure against the radiator that does not damage the radiator fins.

6. An improved radiator hoist and positioner as claimed in claim 1 wherein the yoke structure includes a horizontally elongated cross member to which the hoist line is attached, and two vertically elongated side members secured to the cross member, each clamp mechanism being secured to a side member.

7. An improved radiator hoist and positioner as claimed in claim 1 further comprising means for driving the extension and retraction of said hoist line.

8. An improved radiator hoist and positioner as claimed in claim 7 further comprising means for actuating said drive means.

* * * * *